(12) United States Patent
Caponetti et al.

(10) Patent No.: US 12,006,914 B2
(45) Date of Patent: Jun. 11, 2024

(54) CONTROLLING POWER OUTPUT OF A WIND TURBINE AT BELOW-RATED WIND SPEED

(71) Applicant: VESTAS WIND SYSTEMS A/S, Aarhus N (DK)

(72) Inventors: Fabio Caponetti, Åbyhøj (DK); James Alexander Nichols, Aarhus C (DK); Benjamin Rowlinson, Isle of Wight (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 172 days.

(21) Appl. No.: 17/623,078

(22) PCT Filed: Jun. 22, 2020

(86) PCT No.: PCT/DK2020/050181
§ 371 (c)(1),
(2) Date: Dec. 27, 2021

(87) PCT Pub. No.: WO2020/259774
PCT Pub. Date: Dec. 30, 2020

(65) Prior Publication Data
US 2022/0260053 A1 Aug. 18, 2022

(30) Foreign Application Priority Data
Jun. 27, 2019 (DK) .............................. PA 2019 70412

(51) Int. Cl.
*F03D 7/02* (2006.01)

(52) U.S. Cl.
CPC ........... *F03D 7/0224* (2013.01); *F03D 7/028* (2013.01); *F05B 2270/1033* (2013.01);
(Continued)

(58) Field of Classification Search
CPC ........................ F05B 2270/32; F05B 2270/327
See application file for complete search history.

(56) References Cited

U.S. PATENT DOCUMENTS 8,174,136 B2 * 5/2012 Johnson .................. F03D 7/028
290/44
8,215,906 B2 * 7/2012 Pierce .................... F03D 7/0272
416/41
(Continued)

FOREIGN PATENT DOCUMENTS

EP 2096300 A2 9/2009
EP 2757251 A1 7/2014
(Continued)

OTHER PUBLICATIONS

PCT, Notification of Transmittal of The International Search Report and The Written Opinion of The International Searching Authority, or The Declaration for Application PCT/DK2020/050181 dated Sep. 22, 2020.
(Continued)

*Primary Examiner* — Long T Tran
(74) *Attorney, Agent, or Firm* — Patterson + Sheridan, LLP

(57) ABSTRACT

There is provided a method of controlling power output of a wind turbine at below-rated wind speed, the method comprising: determining an indication of blade torsion of one or more rotor blades of the wind turbine in dependence on wind speed and/or rotor speed; determining a torsion-corrected blade pitch based on the indication of blade torsion; and using the torsion-corrected blade pitch to control pitch the one or more rotor blades.

20 Claims, 7 Drawing Sheets

(52) U.S. Cl.
CPC ..... *F05B 2270/32* (2013.01); *F05B 2270/327* (2013.01); *F05B 2270/331* (2013.01)

(56) References Cited

U.S. PATENT DOCUMENTS

| | | | |
|---|---|---|---|
| 8,890,349 B1 | 11/2014 | Lynch et al. | |
| 9,863,402 B2* | 1/2018 | Perley | F03D 1/0675 |
| 10,036,692 B2* | 7/2018 | Perley | F03D 7/043 |
| 2009/0220340 A1* | 9/2009 | Pierce | F03D 7/043 |
| | | | 416/61 |
| 2009/0295159 A1* | 12/2009 | Johnson | G05B 13/024 |
| | | | 290/44 |
| 2010/0068057 A1 | 3/2010 | Friedrich et al. | |
| 2010/0098540 A1 | 4/2010 | Fric et al. | |
| 2012/0292905 A1* | 11/2012 | Slot | F03D 1/065 |
| | | | 290/55 |
| 2014/0103651 A1* | 4/2014 | Grinblat | H02P 9/48 |
| | | | 290/44 |
| 2015/0361957 A1 | 12/2015 | Agarwal et al. | |
| 2015/0377215 A1 | 12/2015 | Agarwal et al. | |
| 2017/0321660 A1* | 11/2017 | Atzler | G05B 17/02 |
| 2018/0187647 A1* | 7/2018 | Perley | F03D 7/0224 |
| 2018/0320660 A1* | 11/2018 | Herr | F03D 7/028 |
| 2019/0226451 A1* | 7/2019 | Deshpande | F03D 7/0276 |
| 2020/0149508 A1* | 5/2020 | Hug | F03D 3/005 |

FOREIGN PATENT DOCUMENTS

| | | |
|---|---|---|
| EP | 3346125 A1 | 7/2018 |
| EP | 3499023 A1 | 6/2019 |
| GB | 2465790 A | 6/2010 |
| WO | 2007123552 A1 | 11/2007 |
| WO | 2008095707 A2 | 8/2008 |
| WO | 2011150931 A2 | 12/2011 |
| WO | 2012007004 A2 | 1/2012 |
| WO | 2017085156 A1 | 5/2017 |
| WO | 2020259774 A1 | 12/2020 |

OTHER PUBLICATIONS

Danish Patent and Trademark Office, 1st Technical Examination including the Search Report for Patent Application PA 2019 70398 dated Feb. 18, 2020.

Intellectual Property India, Examination Report Under Sections 12 & 13 of the Patents Act, 1970 and the Patent Rules, 2003 for Application 202217003209 dated Jun. 13, 2023.

European Patent Office, Communication of a Notice of Opposition for Application No./Patent No. 20740532.5-1002 / 3990777, dated Mar. 12, 2024 (Mar. 12, 2024).

* cited by examiner

CONTROLLING POWER OUTPUT OF A WIND TURBINE AT BELOW-RATED WIND SPEED

TECHNICAL FIELD

The present invention relates generally to controlling power output of a wind turbine in below-rated wind speed conditions.

BACKGROUND

Wind turbines known in the art comprise a tower supporting a nacelle and a rotor with a number of rotor blades. The rotor blades are typically pitch-adjustable: each blade is rotatable about its longitudinal axis using a pitch actuator. The pitch of each blade is adjusted to change the angle of attack of the blade—typically, blades are pitched in a direction of incoming wind. Changing the angle of attack of the blade changes the aerodynamic loading experienced by the blade, and therefore the power generated by the wind turbine.

It is known to provide wind turbine blades that deform in a desired manner—for instance, blade torsion and/or bending—under loading, which can improve wind turbine performance and increase lifetime of the blades. In particular, it is known to provide blades that exhibit so-called 'bend-twist coupling' deformation to reduce loading incident on the blade, i.e. when the blade is bended it also experiences twist, and vice-versa. Such deformation can change the angle of attack of a bend-twist coupled blade.

As is well known, above a rated wind speed of a wind turbine, the turbine is generally controlled to maintain output of the generator at a constant level equal to the limit that the generator is capable of. In contrast, below the rated wind speed the wind speed is not sufficiently high to generate the maximum power output that the generator is capable of. As such, when the wind speed is below rated wind speed a wind turbine is generally operated to maximise the power output of the generator that is available based on the actual wind speed. Typically, this is achieved by maintaining the blade pitch at a constant angle, and varying generator torque and rotor speed to keep the power coefficient at a maximum.

However, due to the bending and/or twisting of bend-twist coupled blades in response to loading, power output of bend-twist coupled blades maintained at a constant pitch for wind speeds below the rated wind speed is lower when compared with power output of standard blades that are not bend-twist coupled when maintained at constant pitch for the same wind speeds below the rated wind speed. Moreover, bend-twist coupled blades become more torsionally compliant over their lifetime, so the power output changes over time.

The pitch of bend-twist coupled blades can be altered to improve the power output at these wind speeds below the rated wind speed. For example, EP 2848805 teaches that blade pitch angle of bend-twist coupled blades can be adjusted based on a torsion deformation of the blade detected using blade torsion sensors integrated into the blade. The torsion deformation measured by the torsion sensors corresponds to a particular pitch angle that results in an improved power output.

However, blade torsion sensors may be unreliable, and are not standard equipment for wind turbine blades. Their incorporation into wind turbine blades is also expensive, or not possible in some wind turbines. Some torsion sensors are also incapable of operating or inaccurate in particular weather conditions.

It is against this background that the present invention has been developed.

SUMMARY OF THE INVENTION

According to an aspect of the present invention there is provided a method of controlling power output of a wind turbine at below-rated wind speed. The method may comprise determining an indication of blade torsion of one or more rotor blades of the wind turbine in dependence on wind speed and/or rotor speed. The method may comprise determining a torsion-corrected blade pitch based on the indication of blade torsion. The method may comprise using the torsion-corrected blade pitch to control pitch of the one or more rotor blades. In particular, the method may comprise sending a control signal to command pitch control of the one or more rotor blades so as to control power output of the wind turbine.

The method may comprise calculating a tip-speed ratio based on the rotor speed and wind speed. The torsion-corrected blade pitch may be determined based on the tip-speed ratio and the indication of blade torsion.

Determining the torsion-corrected blade pitch may comprise determining a first blade pitch based on the tip-speed ratio, determining a second blade pitch based on the indication of blade torsion, and comparing the first and second blade pitches to determine the torsion-corrected blade pitch.

One or both of the first and second blade pitches may be determined using a look-up table.

The second blade pitch may be a blade pitch offset. Determining the torsion-corrected blade pitch may comprise adjusting the first blade pitch by the blade pitch offset.

Determining the second blade pitch may comprise determining a wind speed blade pitch offset based on an indication of blade torsion determined in dependence on the wind speed, determining a rotor speed blade pitch offset based on an indication of blade torsion determined in dependence on the rotor speed, and calculating the second blade pitch as a sum of the wind speed and rotor speed blade pitch offsets.

Determining the first blade pitch may comprise determining a tip-speed ratio blade pitch based on the tip speed ratio, determining a wind speed blade pitch based on wind speed and/or determining a rotor speed blade pitch based on rotor speed, and calculating the first blade pitch as the minimum of the tip-speed ratio blade pitch and the determined windspeed blade pitch and/or rotor speed blade pitch.

The torsion-corrected blade pitch may be determined to be a minimum of the first and second blade pitches.

The indication of blade torsion of one or more rotor blades of the wind turbine is based on a predetermined relationship between the blade torsion and at least one of the wind speed and the rotor speed. The predetermined relationship may be a functional relationship. The indication of blade torsion may be calculated based on a model of the one or more rotor blades. In this situation the model includes a predetermined relationship which expresses the blade torsion under operating conditions.

Such an approach provides a reliable source of an indication of blade torsion, and is suitable for use on wind turbines that do not have dedicated sensors on the blades for measuring torsion.

In embodiments further parameters than the wind speed and/or the rotor speed may be used as input parameters. In accordance with such embodiments the indication of blade torsion may be determined in dependence on blade root flapwise bending moment. Also, the indication of blade torsion may be determined in dependence on a current operating point of the wind turbine. Additional and/or further parameters may be used for input parameters to the predetermined relationship for determining indication of blade torsion of one or more rotor blades.

Determining the torsion-corrected blade pitch comprises calculating an average torsion along the length of the one or more rotor blades based on the indication of blade torsion, and determining the torsion-corrected blade pitch based on the average torsion along the length of the one or more rotor blades.

Controlling the one or more rotor blades may comprise pitching the one or more rotor blades to the torsion-corrected pitch angle.

According to another aspect of the present invention there is provided a non-transitory, computer-readable storage medium storing instructions thereon that when executed by a processor causes the processor to perform the method described above.

According to another aspect of the invention there is provided a controller for controlling power output of a wind turbine at below-rated wind speed. The controller may be configured to determine an indication of blade torsion of one or more rotor blades of the wind turbine in dependence on wind speed and rotor speed. The controller may be configured to determine a torsion-corrected blade pitch based on the indication of blade torsion. The controller may be configured to send a control signal to command pitch control of the one or more rotor blades using the torsion-corrected blade pitch so as to control power output of the wind turbine.

According to another aspect of the present invention there is provided a wind turbine comprising a controller as described above.

BRIEF DESCRIPTION OF THE DRAWINGS

One or more embodiments of the invention will now be described, by way of example only, with reference to the accompanying drawings, in which:

FIG. 3(a) shows power optimal pitch trajectory against tip-speed ratio, FIG. 3(b) shows power optimal pitch trajectory against wind speed, and FIG. 3(c) shows power optimal pitch trajectory against rotor speed;

DETAILED DESCRIPTION OF EMBODIMENTS

Figure 1:
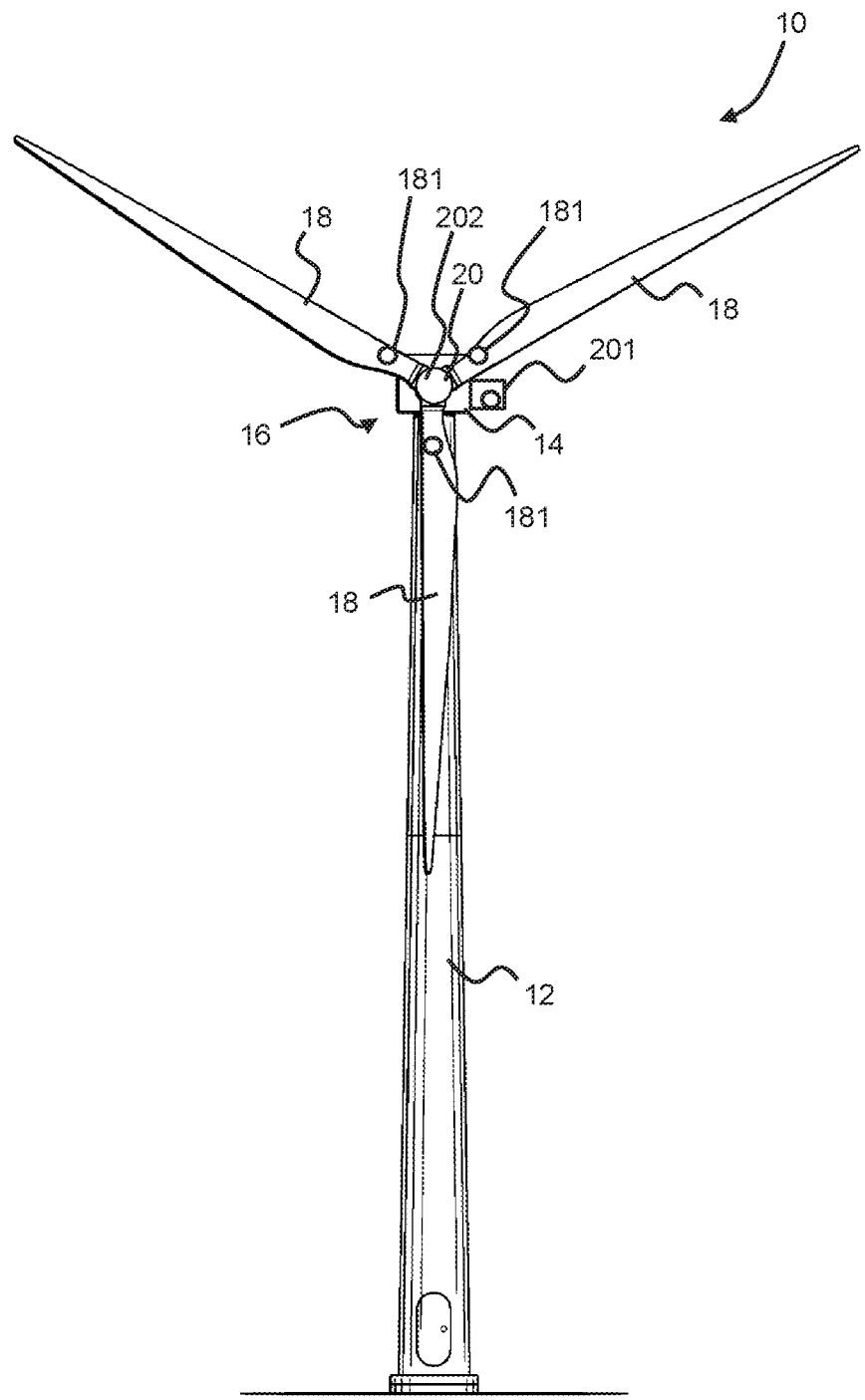
FIG. 1 shows a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In particular, each of the blades 18 is a bend-twist coupled blade—that is, a blade that twists out of the wind to relieve loading on the blade. In this example, the rotor 16 comprises three blades 18 although other configurations are possible.

The wind turbine 10 includes a rotor wind speed detector 201—wind speed measurement may be performed in several ways as the skilled person will appreciate, one being through LIDAR as the skilled person will appreciate from the literature of wind turbine design and control. The wind turbine 10 also includes a rotational speed sensor 202—this may be, for example, in the form of a rotary encoder on a generator shaft of the turbine 10; however, the rotor speed may be determined in any suitable manner.

Shown within each blade 18 is a blade load sensor 181—in other examples there may be multiple blade load sensors allowing blade loads to be represented by more than a single variable. The sensing element may be a fibre optic strain gauge, a resistive strain gauge, or any other appropriate detector.

Figure 2:
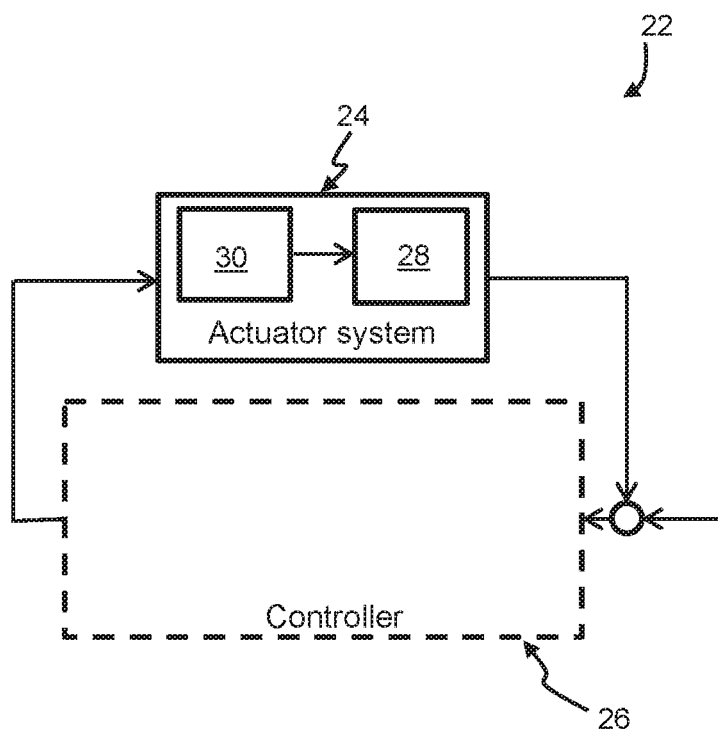
FIG. 2 shows a controller of the wind turbine of FIG. 1, and a pitch actuator system of the wind turbine to be controlled by the controller.

FIG. 2 shows a wind turbine control system 22 in accordance with an example of the invention which may be implemented in the wind turbine 10 of FIG. 1. Here, the control system 22 includes a pitch actuator system 24 that is controlled by a controller 26. The pitch actuator system 24 is, or includes, a system for controlling the pitch of one or more of the wind turbine rotor blades 18 which in turn may include a hydraulic actuator 28 arranged to adjust blade pitch in a known manner. The actual position of the actuator 28 is controllable by an actuator position control unit 30 which provides a positioning command signal to the hydraulic actuator 28.

One or more functional units of the controller 26 may be provided by suitable software running on any suitable computing substrate using conventional or customer processors and memory. Different functional units of the controller 26 may use a common computing substrate (for example, they may run on the same server) or separate substrates, or one or each may themselves be distributed between multiple computing devices.

It should be appreciated that the controller 26 and pitch actuator system 24 may be replicated for each of the blades 18 of the wind turbine 10 so that the position of each blade 18 may be controlled independently—in some examples this may be done to provide individual pitch control or adjustment for each blade 18.

As described above, wind turbines, such as the wind turbine 10 shown in FIG. 1, have a rated wind speed above which a maximum power output of the generator may be achieved. Above the rated wind speed, the power output is maintained at the maximum prescribed for the rated wind speed by adjusting the pitch of the blades 18, among other measures to maintain a constant power output. Below the rated wind speed, the pitch angle can also be adjusted for bend-twist coupled blades to account for blade torsion. As described above, blade torsion can be measured directly using direct blade torsion sensors such as strain gauges.

In one example method of the invention, measured or estimated wind speed and/or rotor speed can be utilised as indirect measures, i.e. proxies, to provide an indication of blade torsion. Using wind speed and/or rotor speed, and/or any other indirect measure of blade torsion, an indication of the blade torsion may therefore be determined in order to adjust the blade pitch accordingly when the wind turbine 10 is operating at below-rated wind speed. Such an approach provides a more reliable source of an indication of blade torsion, and is suitable for use on wind turbines that do not have dedicated sensors on the blades for measuring torsion.

Figure 3:
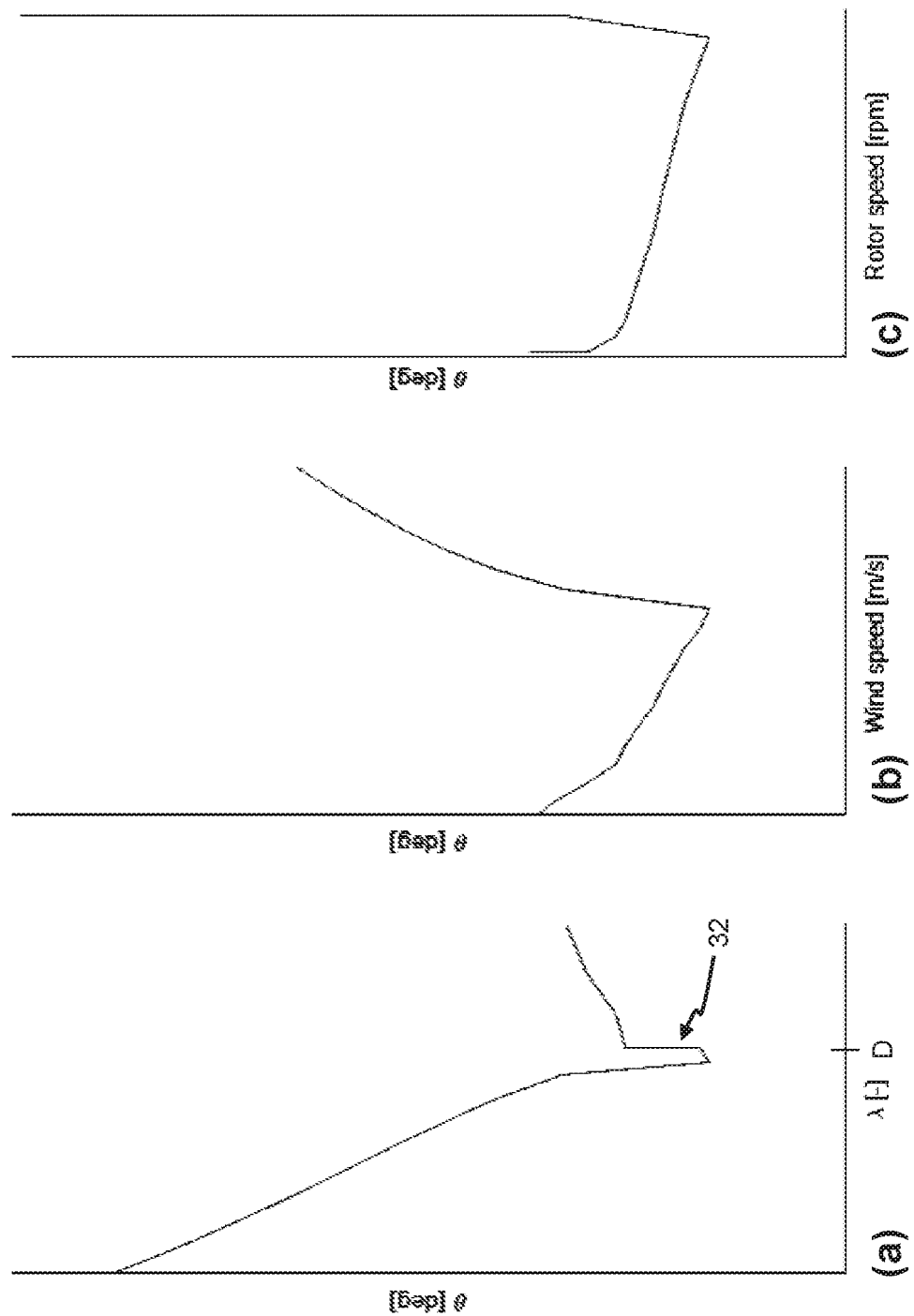
FIGS. 3(a) to 3(c) are plots of power optimal pitch trajectory for blades of the wind turbine of FIG. 1; in particular.

FIGS. 3(a) to 3(c) illustrate plots of power optimal pitch trajectory for the bend-twist coupled blades 18 of the wind turbine 10 of FIG. 1. FIG. 3(a) shows power optimal pitch trajectory against tip-speed ratio (TSR). TSR, as is well understood in the art, is the ratio of the tip-speed of the blades 18—which can be determined from the rotor speed and rotor diameter—to the wind speed incident on the wind turbine 10. It is seen in FIG. 3(a) that a given value or values of TSR may correspond to a number of different optimal pitch angles. In particular, this may occur for pitch angles close to 0 degrees in a so-called 'optimal pitch region'. In FIG. 3, the optimal pitch region is indicated by reference sign 32. It is therefore seen that an indication of TSR may not be sufficient to determine a single optimal pitch angle. That is, TSR values in the optimal power region may correspond to a family of pitch angles, each corresponding to a different loading and blade torsion. This may be explained by the fact that TSR is a ratio of two variables— namely wind speed and rotor speed—and so a particular TSR may correspond to more than one optimal pitch angle, depending on the possible combinations of wind speed and rotor speed. This may be seen in FIG. 3(a) for the optimal TSR value, indicated by reference sign D, and where a vertical line is provided over a range of pitch angles.

Additionally, FIG. 3(b) shows power optimal pitch trajectory against wind speed and FIG. 3(c) shows power optimal pitch trajectory against rotor speed. As can be seen in FIGS. 3(b) and 3(c), individual values of wind speed and rotor speed correspond to a particular pitch angle.

Accordingly, in one exemplary method of the invention, at wind speeds below the rated wind speed, the blade pitch of one or more of the blades 18 is adjusted to account for torsion of the blade, based on indirect measures of blade torsion. In particular, an indication of blade torsion of the one or more blades 18 is determined, in dependence on wind speed and/or rotor speed. An adjusted pitch. i.e. a torsion-corrected blade pitch, of the blade 18 is determined based on the indication of blade torsion. The torsion-corrected blade pitch is used to control pitch of the one or more blades 18. This is described in greater detail below.

The present method describes utilising the identified relationship between the blade torsion and wind speed and/or rotor speed to account for self-unloading by blades and the resulting sub-optimal power output. In a specific example, as described above, the method describes determining an indication of blade torsion based on the wind speed and/or rotor speed, determining an adjusted pitch angle based on that indication, and then using the adjusted pitch angle to control the wind turbine 10.

In other examples, the method describes determining an indication of blade torsion based on the wind speed and/or rotor speed and determining a corrected blade pitch based on a TSR value and the indication of blade torsion. The determination of a corrected pitch is based on both the TSR and the indication of blade torsion to account for the family of pitch angles at the optimal TSR. In particular, such a method may comprise determining a first pitch angle based on the TSR, and a second pitch angle based on the indication of blade torsion. The second pitch angle may be an offset pitch angle, i.e. a correction, which can be applied to the first pitch angle, or may be an absolute pitch angle that is used instead of the first pitch angle.

In some examples, the second pitch angle itself may be considered to be the indication of blade torsion.

In yet further examples, the method describes determining an indication of blade torsion based a model of the blade formulated based on parameters such as wind speed, rotor speed, blade root flapwise moment, and active power output.

Figure 4:
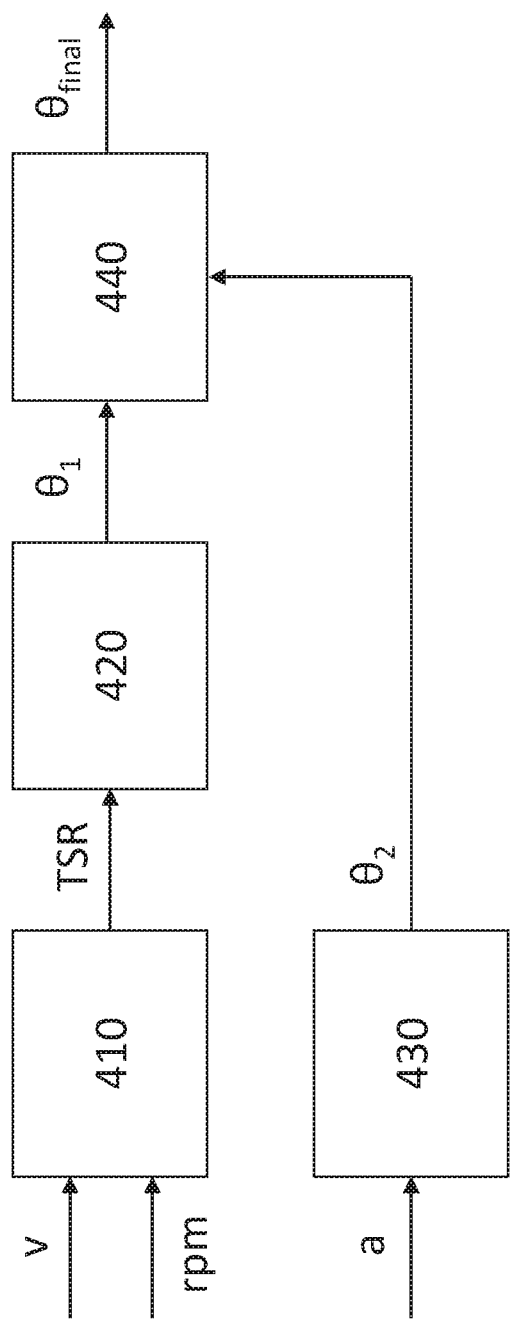
FIG. 4 illustrates a control strategy for the controller of FIG. 2 for determining blade pitch according to an example of the invention.

FIG. 4 illustrates an example control strategy 40 for the controller 26. Specific examples of control strategies 50, 60 for the controller 26 are discussed later in relation to FIGS. 5 and 6.

In the control strategy 40 of FIG. 4, measured or estimated values of rotor speed—labelled 'rpm'- and wind speed—labelled 'v'—are provided as inputs to block 410. Using the inputs, a TSR is calculated and output at block 410 based on the input rotor speed and wind speed. The TSR is provided as an input to block 420, where a first pitch angle, $\theta_1$, is determined based on the input TSR. The first pitch angle corresponding to the TSR is determined according to a predetermined look-up table or by other means, such as a predictive model.

At least one input—labelled 'a'—is provided to block 430. A second pitch angle, $\theta_2$, is determined at block 430 based on the input to the block. The second pitch angle may be determined based on a look-up table for the input or otherwise, for example, using a model or a particular function representing blade torsion so that block 430 can be represented by a formula: $\theta_2=f_r(a)$ where T is blade torsion.

The first and second pitch angles, $\theta_1$ and $\theta_2$, are provided as inputs to block 440, where a determination of a final pitch angle, $\theta_{final}$, is performed using a predefined function and based on the two input pitch angles, $\theta_1$ and $\theta_2$. The final pitch angle is provided as an output from the controller 26 to the pitch actuator system 24. The pitch actuator system 24 uses the final pitch angle to control pitch of the blade(s) 18 of the wind turbine 10.

In specific examples, the input, a, provided to block 430 to determine the second pitch angle, $\theta_2$, is the wind speed, v. In other examples, the input, a, provided to block 430 to determine the second pitch angle, $\theta_2$, is the rotor speed, rpm. Other indirect measures of blade torsion may also be provided as inputs to block 430, such as blade root flapwise bending moment.

At block 440, a function is performed on the first and second pitch angles, $\theta_1$ and $\theta_2$, to determine the final pitch angle $\theta_{final}$. The function may comprise an addition or a subtraction to apply the second pitch angle as an offset to the first pitch angle. For example, the first pitch angle is determined as an absolute pitch angle so that a pitch angle is specified to which the blade 18 may be actuated. The second pitch angle is determined as an offset to be applied to the absolute pitch angle, so that the first pitch angle is adjusted or corrected according to the second pitch angle. Returning briefly to FIG. 3(a), if the TSR is determined to be the optimal TSR, block 420 may then determine the first pitch angle to be 0, for example. At block 430, the offset is determined based on the wind speed, and the offset may be identified as −0.5, for example. Therefore, where block 440 is an addition function, the final pitch angle output to the pitch actuator system 24 would be −0.5 degrees.

The function may alternatively be a minimum function. In this case, both first and second pitch angles are provided as absolute pitch angles. The function at block 440 determines which of the first and second pitch angles is the minimum pitch angle and that pitch angle is provided as the output final pitch angle. The final pitch angle is provided to the pitch actuator system 24, and the pitch actuator system 24 operates the hydraulic actuator 28 using the control system 30 to adjust pitch of one or more of the blades 18 as required.

Figure 5:
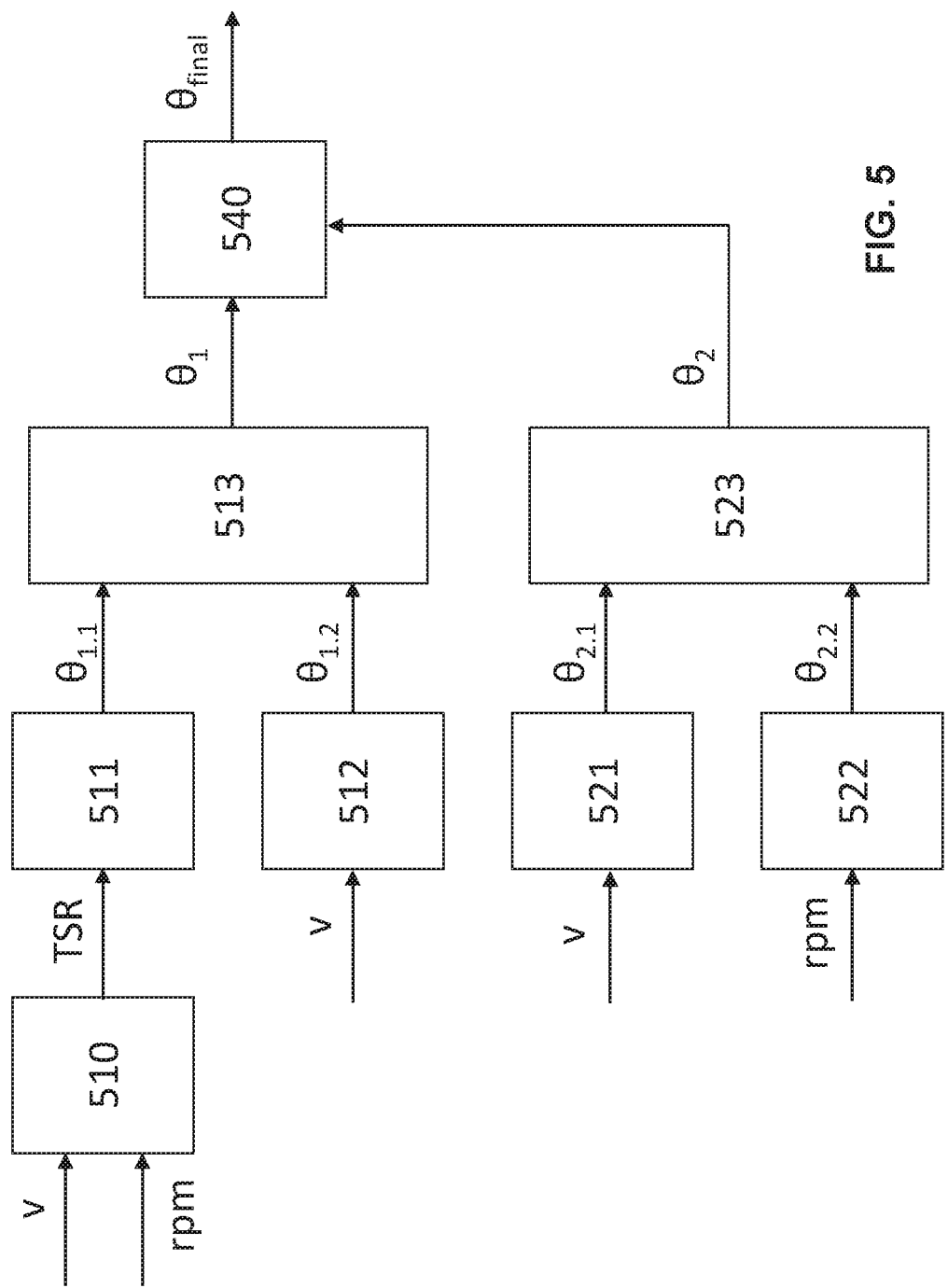
FIG. 5 illustrates a control strategy for the controller of FIG. 2 for determining blade pitch according to another example of the invention.

A specific example implementing the approach outlined above is shown in FIG. 5. In FIG. 5, the wind speed, v, and rotor speed, rpm, are provided as inputs to block 510 to calculate TSR. The TSR is provided to block 511, where a determination of a preliminary TSR pitch angle, $\theta_{1.1}$, is performed. The TSR pitch angle is determined based on a look-up table.

The wind speed is provided as an input to block 512 to identify a wind-speed pitch angle, $\theta_{1.2}$. The wind-speed pitch angle is determined with reference to a look-up table.

Both the absolute TSR and wind-speed pitch angles, $\theta_{1.1}$ and $\theta_{1.2}$, are provided as inputs to block 513. The first pitch angle, $\theta_1$, is determined as a minimum of the two input pitch angles, $\theta_{1.1}$ and $\theta_{1.2}$, using a minimum function so that the minimum of the TSR pitch angle and the wind-speed pitch angle is used as the first pitch angle.

The second pitch angle, $\theta_2$, which is an offset pitch angle, is determined based on two preliminary offset pitch angles. A wind-speed pitch angle offset, $\theta_{2.1}$, is determined at block 521 based on a look-up table that uses wind speed, v, as an input. A rotor-speed pitch angle offset, $\theta_{22}$, is determined at block 522 based on a look-up table that uses rotor speed, rpm, as an input. The rotor-speed pitch angle offset and wind-speed pitch angle offset. $\theta_{2.1}$ and $\theta_{2.2}$, are provided as inputs to block 523, where the rotor-speed and wind-speed pitch angle offsets are added together to provide the second pitch angle $\theta_2$ as an output.

The output first and second pitch angles, $\theta_1$ and $\theta_2$, are provided to block 540, where, like block 440 in FIG. 4, the offset second pitch angle, $\theta_2$, is applied to the absolute first pitch angle, $\theta_1$, to output a final pitch angle $\theta_{final}$. The final pitch angle is provided to the pitch actuator system 24 to alter pitch of one or more of the blades 18. The pitch actuator system 24 operates the hydraulic actuator 28 using the control system 30 accordingly.

Figure 6:
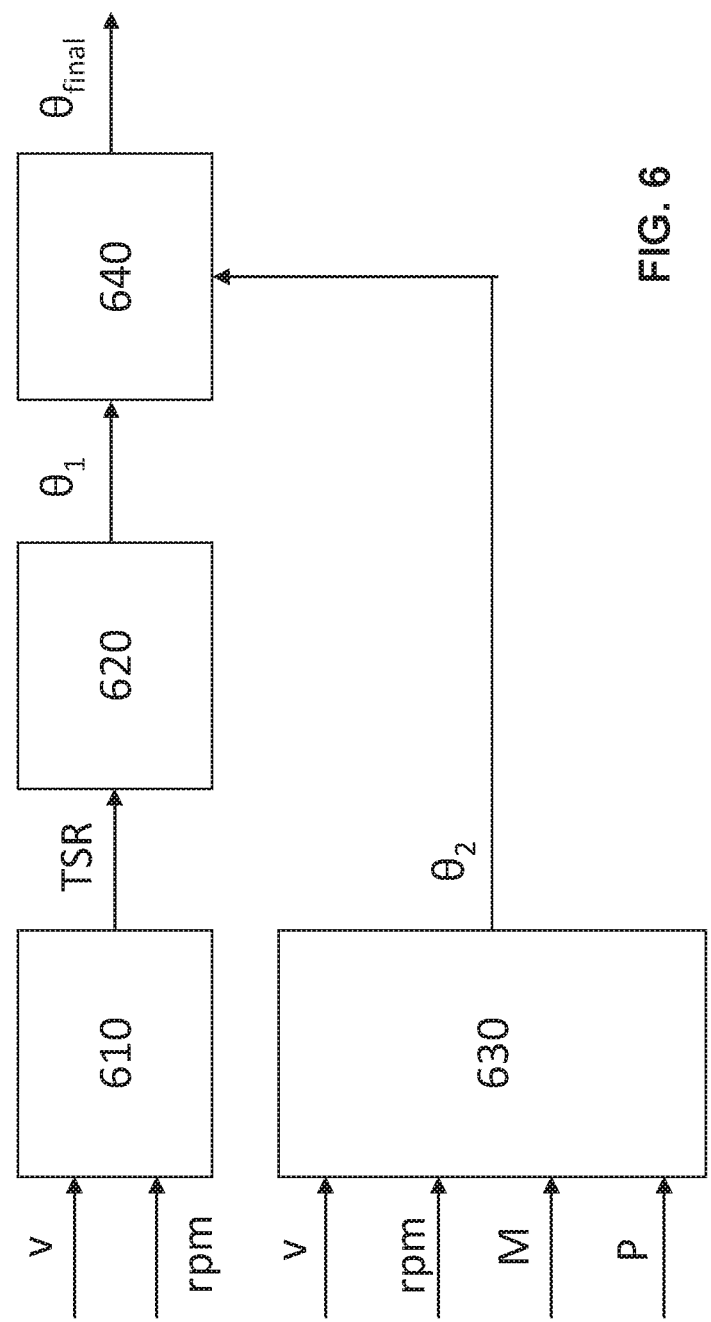
FIG. 6 illustrates a control strategy for the controller of FIG. 2 for determining blade pitch according to another example of the invention; and, FIG. 7 outlines the steps of a method executed by the controller of FIG. 2 according to an example of the invention.

FIG. 6 illustrates another specific embodiment of the invention. In FIG. 6, the first pitch angle, $\theta_1$, is determined at block 620 based on a TSR value calculated at block 610 and with reference to a look-up table.

In this example, the second pitch angle, $\theta_2$, is determined at block 630. Block 630 represents an observer that receives at least one input based on an operating parameter indicative of a current operating point of the wind turbine and utilises that at least one parameter to determine the second pitch angle based on the value for the parameter. The observer determines the second pitch angle by inputting the value for the parameter or parameters into a model of the wind turbine or a model of an individual wind turbine blade and receiving an estimate or indication of blade torsion, typically an average or mean blade torsion, experienced by the blade. The observer determines a pitch angle corresponding to the estimated blade torsion and this value is output from block 630 as the second pitch angle. The output second pitch angle may be an offset or an absolute value. The observer, in this example, receives inputs of wind speed v, rotor speed rpm, blade root flapwise bending moment M, and active power P. In other examples the observer may receive more or fewer inputs and may receive values for a variety of different input parameters.

The first pitch angle and second pitch angle are provided to block 640. As in FIG. 4 and block 440, a function is performed at block 640 using both the first and second pitch angles. If the second pitch angle is an offset pitch angle, the first pitch angle is adjusted by the amount specified by the second pitch angle to produce the final pitch angle. If the second pitch angle is an absolute pitch angle, a comparison is performed and, for example, the minimum value selected as the final pitch angle.

Figure 7:
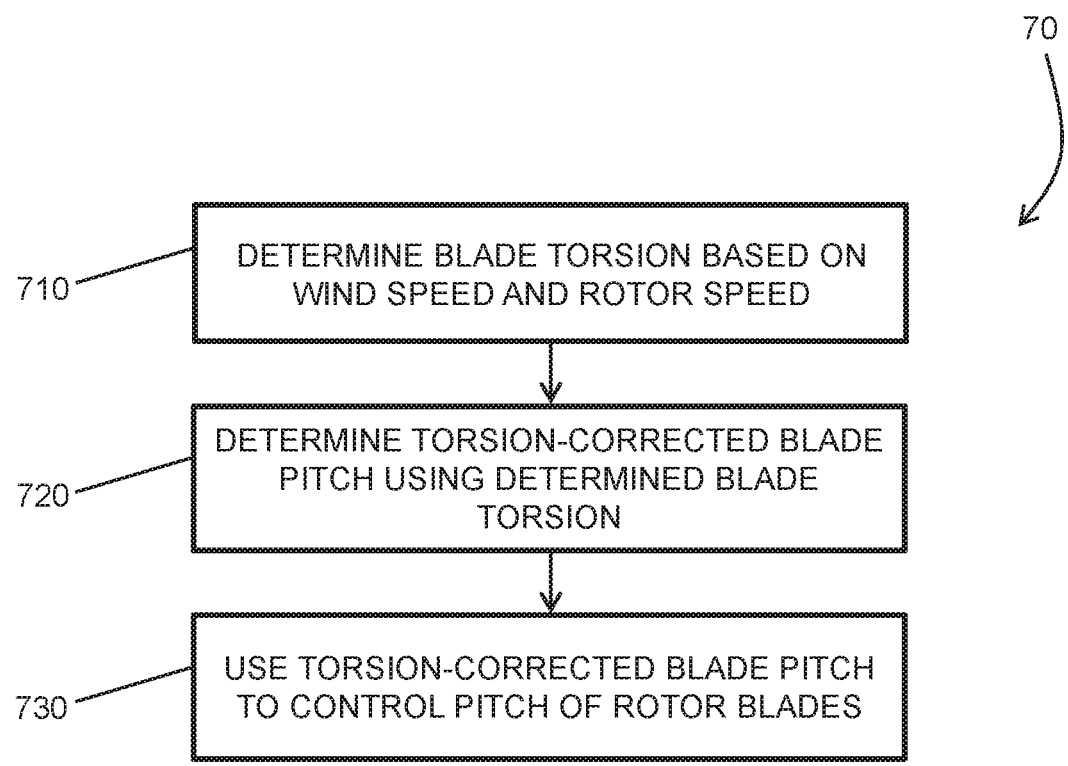

FIG. 7 summarises the steps of a method 70 performed by the controller 26 to determine a torsion-corrected pitch reference for each of the blades 18 of the wind turbine 10. The method 70 of FIG. 7 are steps performed in each of the control strategies of FIGS. 4 to 6.

At step 710, an indication of blade torsion is determined based on wind speed and rotor speed. The indication of blade torsion is not a measured blade torsion, but rather a proxy to it. For example, the indication may include an estimated blade torsion value obtained from a model, or an indication based on a look-up table. The indication may include several values that are indirect measures of blade torsion. In the examples described above, the wind speed is received from the wind speed detector 201 and the rotor speed is received from the rotor speed detector 202. In other examples, the wind speed and/or rotor speed may be determined using other detectors or calculators. In the described examples, the method may comprise calculating a tip-speed ratio based on the rotor speed and wind speed.

At step 720, a torsion-corrected blade pitch is determined using the blade torsion indication determined in step 710. As described above, the final pitch angle, here referred to as the torsion-corrected blade pitch, is generally a function of at least a first blade pitch angle and a second blade pitch angle. In the examples described above, the torsion-corrected blade pitch is the minimum of two absolute blade pitches or a first blade pitch corrected by a second blade pitch. Any appropriate function may be used to determine a torsion-corrected blade pitch.

The torsion-corrected blade pitch is determined to account for the self-unloading of a blade under a particular load that leads to a reduction in power output potential. The torsion-corrected blade pitch accounts for the torsion that the blade undergoes in response to the load as the angle of attack of the blade relative to the wind direction is changed, thereby improving the maximum power output that is achievable using the blade.

At step 730, the torsion-corrected blade pitch is used to control the pitch of the rotor blades. In the examples described above, using the torsion-corrected blade pitch includes outputting the torsion-corrected blade pitch to the pitch actuator system 26 and adjusting the pitch of one or more of the blades 18 using the hydraulic actuator 28 under the control of the control system 30. The pitch of the blades 18 is adjusted to the torsion-corrected blade pitch in the above examples.

Steps 710, 720 and 730 may be repeated as often as required to account for changing wind speed and/or rotor speed.

Examples of the invention are advantageous in that blade pitch is corrected to account for blade torsion without the need for dedicated torsion sensors or detectors. By using an indication of blade torsion, i.e. an indirect measure rather than a direct measure, the power output can be accurately and reliably controlled through blade pitch adjustments.

Moreover, the indication of blade torsion of the one or more blades is based on at least one or both of wind speed and rotor speed. Both of these parameters are already measured or calculated during normal operation of conventional wind turbines, and the sensors used to measure or calculate these parameters are accurate in their measurements. It is also important to note that wind speed and rotor speed sensors are common in all wind turbines, including older models, whereas torsion sensors are a relatively recent development. As such, the above method is also suitable for applying to existing wind turbines without any modification of the wind turbine being required.

Importantly, the sensors for measuring wind speed and rotor speed are also reliable, and typically more reliable than torsion sensors on blades. As these sensors are generally separate from the wind turbine blades, the blades are unaffected by their use in the method.

Such a method is particularly useful in bend-twist coupled blades, which act to unload aerodynamic loads incident on them by deforming, as an optimum or desirable pitch angle for bend-twist coupled blades may depend on the value of a particular operating condition of the wind turbine other than blade torsion. Taking account of wind speed and rotor speed at least, and using these to determine a blade pitch, enables improved power output with wind turbines with bend-twist coupled blades.

It will be appreciated that various changes and modifications can be made to the present invention without departing from the scope of the present application.

In some examples, the torsion-corrected or final blade pitch may be determined using an appropriate function. For example, where a minimum is found, or a subtraction or addition performed in the above control strategies, a median or mean pitch angle may be identified, or a more complex calculation performed to identify an appropriate pitch angle.

In some examples, the method may comprise a validation step, whereby a measured blade torsion received from blade torsion detectors is used to determine a corrected pitch angle that can be compared to the torsion-corrected pitch angle obtained using wind speed and rotor speed. The blade torsion detectors may be mounted periodically to the blades, or may be integral therewith such as the strain gauges 181 in FIG. 1. Where differences in the determined pitch angles are present, the controller 26 iteratively improves the models and/or look-up tables with which its determinations are made to improve the accuracy of the system. Such a system may employ machine learning to identify the change of blade torsion over time so that further adjustments may be made in future.

In some examples, a centralised wind park controller performs the above methods and control strategies rather than an individual wind turbine controller.

In some examples, one or more switches are included to permit different combinations of pitch angles for use in determining the torsion-corrected pitch angle. The switches may be responsive to operating conditions or centralised control commands.

The invention claimed is:

1. A method of controlling power output of a wind turbine at below-rated wind speed, the method comprising:
   determining an indication of blade torsion of one or more rotor blades of the wind turbine based on a predetermined relationship between the blade torsion and at least one of a wind speed and a rotor speed;
   calculating a tip-speed ratio based on the rotor speed and the wind speed;
   determining a torsion-corrected blade pitch based on the indication of blade torsion and the tip-speed ratio, wherein determining the torsion-corrected blade pitch comprises determining a first blade pitch based on the tip-speed ratio, determining a second blade pitch based on the indication of blade torsion, and comparing the first and second blade pitches to determine the torsion-corrected blade pitch; and
   using the torsion-corrected blade pitch to control pitch of the one or more rotor blades.

2. The method of claim 1, wherein one or both of the first and second blade pitches is determined using a look-up table.

3. The method of claim 1, wherein the second blade pitch is a blade pitch offset, and wherein determining the torsion-corrected blade pitch comprises adjusting the first blade pitch by the blade pitch offset.

4. The method of claim 3, wherein determining the second blade pitch comprises:
   determining a wind speed blade pitch offset based on an indication of blade torsion determined in dependence on the wind speed;
   determining a rotor speed blade pitch offset based on an indication of blade torsion determined in dependence on the rotor speed; and
   calculating the second blade pitch as a sum of the wind speed and rotor speed blade pitch offsets.

5. The method of claim 3, wherein determining the first blade pitch comprises:
   determining a tip-speed ratio blade pitch based on the tip-speed ratio;
   determining a wind-speed blade pitch based on the wind speed and/or determining a rotor-speed blade pitch based on the rotor speed; and
   calculating the first blade pitch as a minimum of the tip-speed ratio blade pitch and the determined wind-speed blade pitch and/or rotor-speed blade pitch.

6. The method of claim 1, wherein the torsion-corrected blade pitch is determined to be a minimum of the first and second blade pitches.

7. The method of claim 1, wherein the indication of blade torsion is determined in dependence on blade root flapwise bending moment.

8. The method of claim 1, wherein the indication of blade torsion is determined in dependence on a current operating point of the wind turbine.

9. The method of claim 1, wherein determining the torsion-corrected blade pitch comprises:
   calculating an average torsion along a length of the one or more rotor blades based on the indication of blade torsion; and,
   determining the torsion-corrected blade pitch based on the average torsion along the length of the one or more rotor blades.

10. The method of claim 1, wherein the indication of blade torsion is calculated based on a model of the one or more rotor blades.

11. The method of claim 1, wherein controlling the one or more rotor blades comprises pitching the one or more rotor blades to the torsion-corrected blade pitch.

12. A controller for controlling power output of a wind turbine at below-rated wind speed, the controller being configured to:
   determine an indication of blade torsion of one or more rotor blades of the wind turbine in dependence on wind speed and rotor speed;
   calculate a tip-speed ratio based on the rotor speed and the wind speed;
   determine a torsion-corrected blade pitch based on the indication of blade torsion and the tip-speed ratio, wherein determining the torsion-corrected blade pitch comprises determining a first blade pitch based on the tip-speed ratio, determining a second blade pitch based on the indication of blade torsion, and comparing the first and second blade pitches to determine the torsion-corrected blade pitch; and send a control signal to command pitch control of the one or more rotor blades using the torsion-corrected blade pitch.

13. The controller of claim 12, wherein one or both of the first and second blade pitches is determined using a look-up table.

14. The controller of claim 12, wherein the second blade pitch is a blade pitch offset, and wherein determining the torsion-corrected blade pitch comprises adjusting the first blade pitch by the blade pitch offset.

15. The controller of claim 12, wherein in determining the first blade pitch, the controller is configured to:
   determine a tip-speed ratio blade pitch based on the tip-speed ratio;
   determine a wind-speed blade pitch based on the wind speed and/or determining a rotor-speed blade pitch based on the rotor speed; and
   calculate the first blade pitch as a minimum of the tip-speed ratio blade pitch and the determined wind-speed blade pitch and/or rotor-speed blade pitch.

16. The controller of claim 12, wherein the torsion-corrected blade pitch is determined to be a minimum of the first and second blade pitches.

17. The controller of claim 12, wherein in determining the torsion-corrected blade pitch, the controller is configured to:
   calculate an average torsion along a length of the one or more rotor blades based on the indication of blade torsion; and,
   determine the torsion-corrected blade pitch based on the average torsion along the length of the one or more rotor blades.

18. A wind turbine, comprising:
a tower;
a nacelle disposed on the tower;
a rotor extending from the nacelle and having a plurality of blades disposed on a distal end thereof;
a controller configured to:
   determine an indication of blade torsion of one or more rotor blades of the wind turbine in dependence on wind speed and rotor speed;
   calculate a tip-speed ratio based on the rotor speed and the wind speed;
   determine a torsion-corrected blade pitch based on the indication of blade torsion and the tip-speed ratio, wherein determining the torsion-corrected blade pitch comprises determining a first blade pitch based on the tip-speed ratio, determining a second blade pitch based on the indication of blade torsion, and comparing the first and second blade pitches to determine the torsion-corrected blade pitch; and
   send a control signal to command pitch control of the one or more rotor blades using the torsion-corrected blade pitch.

19. The wind turbine of claim 18, wherein in determining the first blade pitch, the controller is configured to:
   determine a tip-speed ratio blade pitch based on the tip-speed ratio;
   determine a wind-speed blade pitch based on the wind speed and/or determining a rotor-speed blade pitch based on the rotor speed; and
   calculate the first blade pitch as a minimum of the tip-speed ratio blade pitch and the determined wind-speed blade pitch and/or rotor-speed blade pitch.

20. The wind turbine of claim 18, wherein the torsion-corrected blade pitch is determined to be a minimum of the first and second blade pitches.

* * * * *